Jan. 5, 1960  P. C. JACOBS, JR., ET AL  2,920,241
CIRCUIT INTERRUPTERS WITH BACK-UP CURRENT-LIMITING FUSES
Filed April 16, 1956                                    5 Sheets-Sheet 4

Inventors:
Philip C. Jacobs, Jr.
Frederick J. Kozacka,
by
Attorney

United States Patent Office 2,920,241
Patented Jan. 5, 1960

2,920,241

CIRCUIT INTERRUPTERS WITH BACK-UP CURRENT-LIMITING FUSES

Philip C. Jacobs, Jr., Newtonville, Mass., and Frederick J. Kozacka, South Hampton, N.H., assignors to The Chase-Shawmut Company, Newburyport, Mass.

Application April 16, 1956, Serial No. 578,251

8 Claims. (Cl. 317—26)

This invention refers to protective systems such as widely used, for instance, for the protection of distribution networks and industrial feeder circuits. From a more limited point of view this invention refers to protective systems wherein protection is achieved by the joint action of serially connected automatic circuit interrupters or circuit breakers and of current-limiting back-up fuses therefor.

Ever increasing load concentrations resulting in available fault currents of ever increasing magnitude make it necessary, or even imperative, to provide circuit breakers for the protection of distribution networks or industrial feeders with current-limiting back-up fuses. Space limitation prevailing in electrical installations tend to make it difficult, if not impossible, to accommodate within the limited space available the current-limiting fuses required for back-up protection of circuit breakers. Recent progress in the design of current-limiting fuses resulting in the development of very compact current-limiting fuses for high current-carrying ratings and high interrupting ratings has somewhat alleviated that difficult situation; however, no positive way out of the aforementioned difficulties has been found to date.

Circuit breakers for the protection of distribution networks and industrial feeder systems have standardized sizes, and in layouts of switching systems or switchboards spaces corresponding to these standardized sizes are allocated for the circuit breakers. It is general practice to arrange molded case circuit breakers in abutting relation, one immediately adjacent the other, leaving no space whatever for accommodating current-limiting back-up fuses except inside the housings of the circuit breakers. There is very little excess space inside the housing of a well designed circuit breaker, and therefore it is very difficult to accommodate even the most compactly designed current-limiting fuse inside of the housing of a circuit breaker of standard size.

To accommodate current-limiting fuses in the housing of a pre-existing circuit interrupter, or circuit breaker, requires major changes, involving high re-tooling cost. It is, therefore, one object of the invention to provide means which limit the cost of changeover from circuit protection by automatic circuit interrupters or circuit breakers alone to circuit protection by combinations of automatic circuit interrupters, or circuit breakers, and current-limiting fuses.

Another object of the invention is to provide a system of circuit breakers which operates selectively in the overload range, and non-selectively in the major fault current range, the prime cost of which system is smaller than that of a conventional selective system and comparable to that of a cascaded system, and which system is free from the disadvantages and limitations of cacaded systems.

Another object of the invention is to provide an inexpensive system of selectively operating circuit breakers which are backed-up by current-limiting fuses in which system the cost of providing current-limiting back-up fuses are minimized by the application of a special type of current-limiting fuses capable of backing up two or more circuit breakers which are serially arranged in the system.

These and other objects of our invention will be made more apparent from the following description of a system, and of a circuit breaker, embodying the principles of our invention.

Referring to the drawings:

Fig. 7 is a diagram illustrating how to coordinate circuit breakers and current-limiting back-up fuses therefor.

Figure 1:
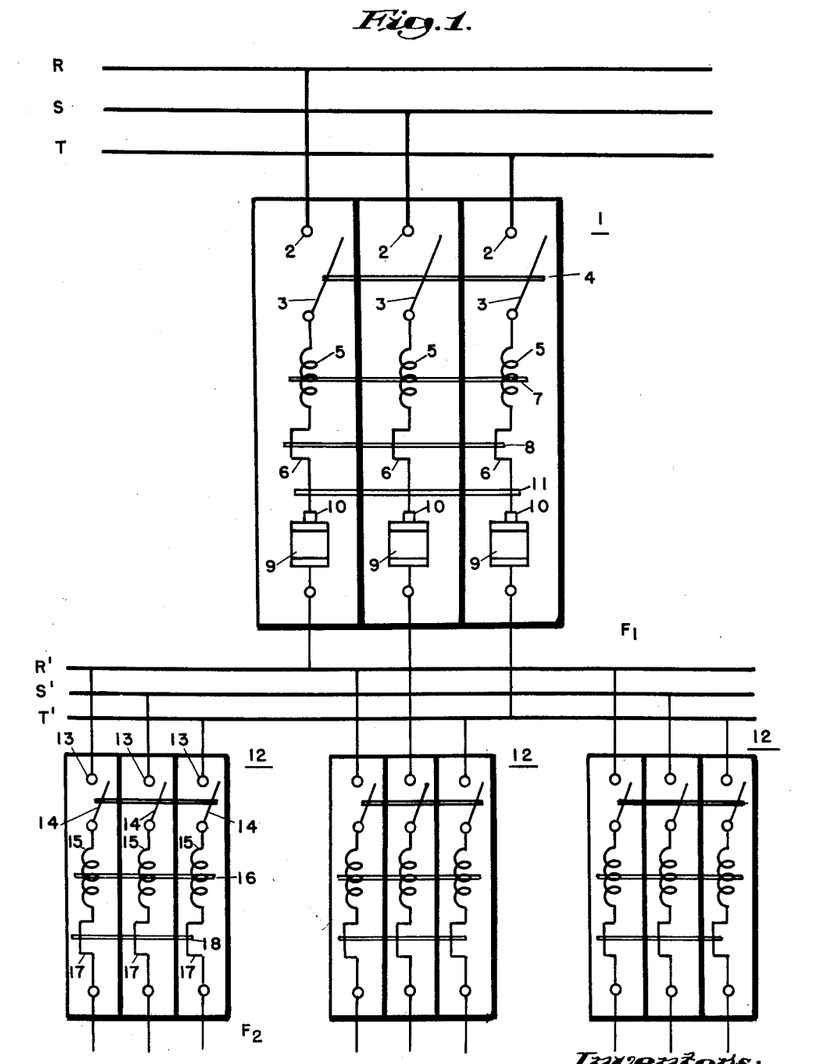
Fig. 1 is a diagrammatic representation of a system of circuit breakers embodying the invention.

Referring now to the drawing, and more particularly to Fig. 1 thereof, reference letters R, S, T have been applied to indicate three bus bars to which a multipolar main circuit breaker generally indicated by reference numeral 1 is connected. Circuit breaker 1 comprises three fixed contacts 2, three movable contacts 3 mechanically tied together by cross-bar 4, three electromagnetic instantaneously operating tripping devices 5, and three thermal overload tripping devices 6 having inverse time-current tripping characteristics. Circuit breaker 1 comprises an operating mechanism for the movable contacts 3 including a handle and a trip-free latch not shown in Fig. 1, but shown in Fig. 2 and fully described in connection therewith. The three tripping devices 5 operate a common trip bar 7 and the three tripping devices 6 operate a common trip bar 8. If desired, a single trip bar operated by all the tripping devices 5 and 6 may be substituted for the two aforementioned trip bars 7 and 8. The three current-limiting fuses 9 are built into the frame structure of the circuit breaker 1 and form an integral part thereof. Each of the three current-limiting fuses 9 is serially connected with one electromagnetic tripping device 5 and one thermal tripping device 6. Each fuse 9 is provided with a striker pin 10 forcefully ejected from the respective fuse upon blowing thereof. Striker pins 10 are arranged to operate a common trip bar 11. Each of the three trip bars 7, 8 and 11 is adapted to rock in response to operation of one of the tripping devices 5, 6, or in response to blowing of one of the fuses 9, resulting in unlatching the trip-free latch mechanism of the circuit breaker and consequent separation of contacts 3 from contacts 2. The load side of circuit breaker 1 is connected to three buses R', S', T'. Reference numeral 12 has been applied to designate three identical circuit breakers connected to buses R', S', T'. The three circuit breakers 12 have a smaller current-carrying capacity and a smaller interrupting capacity than the circuit breaker 1. Their structure is generally similar to that of circuit breaker 1, except for the fact that they are not provided with current-limiting back-up fuses. Circuit breakers 12 comprise fixed contacts 13, relatively movable contacts 14, electromagnetic tripping devices 15 operating the joint trip bar 16, and thermal overload inverse time-current tripping devices 17 operating the common trip bar 18.

Circuit breakers 1 and 12 have predetermined interrupting capacity ratings in a system of graded interrupting capacity ratings. As mentioned before, the interrupting capacity rating of circuit breakers 12 is smaller than that of circuit breaker 1. The tripping means 5, 6 of circuit breaker 1 may have any desired time-current tripping characteristic as, for instance, that shown in Fig. 7. The current-limiting back-up fuses of circuit breaker 1 have a predetermined time-current blowing characteristic coordinated with said tripping characteristic to crossover at a smaller ampere value than the interrupting capacity corresponding to the next smaller rating step in said system of interrupting capacity ratings.

If a major fault occurs ahead of circuit breakers 12 in the general area designated by the reference $F_1$, such fault will be cleared by blowing of current-limiting fuses 9. Blowing of fuses 9 causes operation of striker pins 10, resulting in separation of contacts 3 from contacts 2. If a major fault occurs on the load side of circuit breaker 12 in the general area designated by the reference $F_2$, such fault will again be cleared by blowing of fuses 9, thus providing protection for circuit breaker 1 as well as for circuit breakers 12. This enables to achieve substantial economies when converting existing distribution systems without back-up protection by current-limiting fuses into systems including such back-up protection as well as when laying out new distribution systems including back-up protection by current-limiting fuses. It will be apparent that the current-limiting fuses 9 associated with circuit breaker 1 will always be called upon to clear a major fault if the fault currents exceed the interrupting capacity rating of one of the smaller circuit breakers 12. This is, however, no serious limitation of the system in view of the economies which it achieves and in view of the fact that the occurrence of such fault currents is infrequent.

The system shown in Fig. 1 operates selectively at overload currents or minor fault currents. It differs significantly from systems of cascaded circuit breakers inasmuch as interruption of major fault currents never depends upon the joint action of serially related breaks in different circuit breakers, but is predicated upon the interrupting capacity of a minimum number of current-limiting fuses which interrupting capacity is sufficiently high to clear any fault current which the system is capable of producing.

When a major fault occurs on the load side of one of the circuit breakers 12, the let-through current through current-limiting fuses 9 and the time during which the let-through current flows are always sufficiently high to fully energize the electromagnetic tripping devices 15 of the respective circuit breaker 12, resulting in joint opening of that circuit breaker and of circuit breaker 1 which is being opened by the action of striker pins 10 of fuses 9. If the latch friction and the trip mechanism pick up energy of circuit breaker 1 are sufficiently low, the let-through current through fuses 9 may be relied upon to energize the respective electromagnetic tripping device 5 any time one of the three current-limiting fuses 9 blows, in which case the striker pins 10 of current-limiting fuses 9 and trip bar 11 in circuit breaker 1 may be dispensed with. Such a simplified circuit breaker structure has been illustrated in Figs. 2 and 3.

It will be apparent that the current-limiting fuses 9 of circuit-breaker 1 will blow when one of the circuit-breakers 12 is being closed against a major fault in the load area designated by reference character $F_2$. It is, therefore, safe to close any of circuit breakers 12 against a fault, even if the fault current should substantially exceed the interrupting capacity of the respective small circuit breaker 12.

Figure 2:
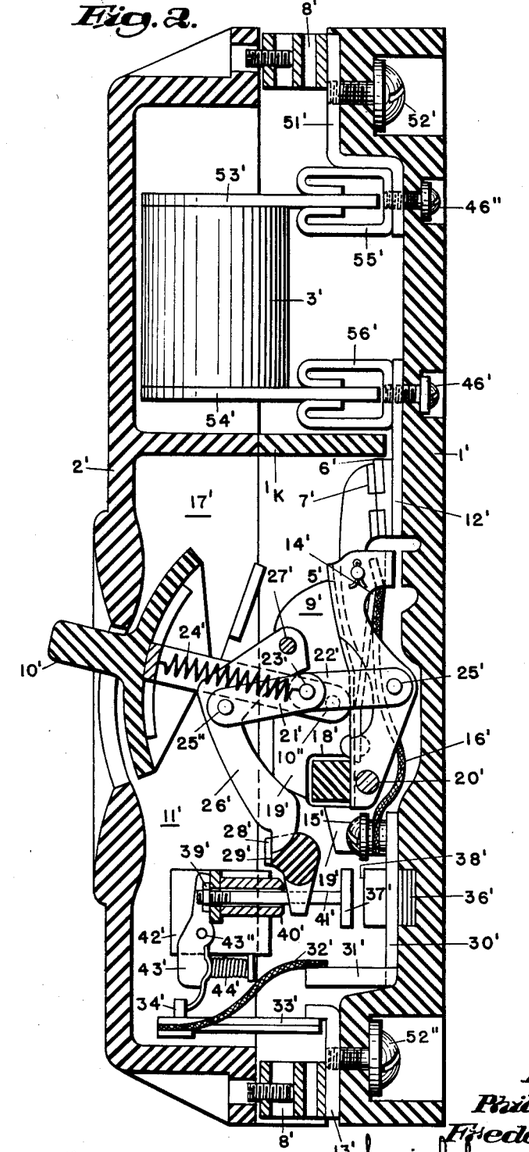
Fig. 2 is a side elevation, partly in section, of a circuit breaker embodying the invention.
Figure 3:
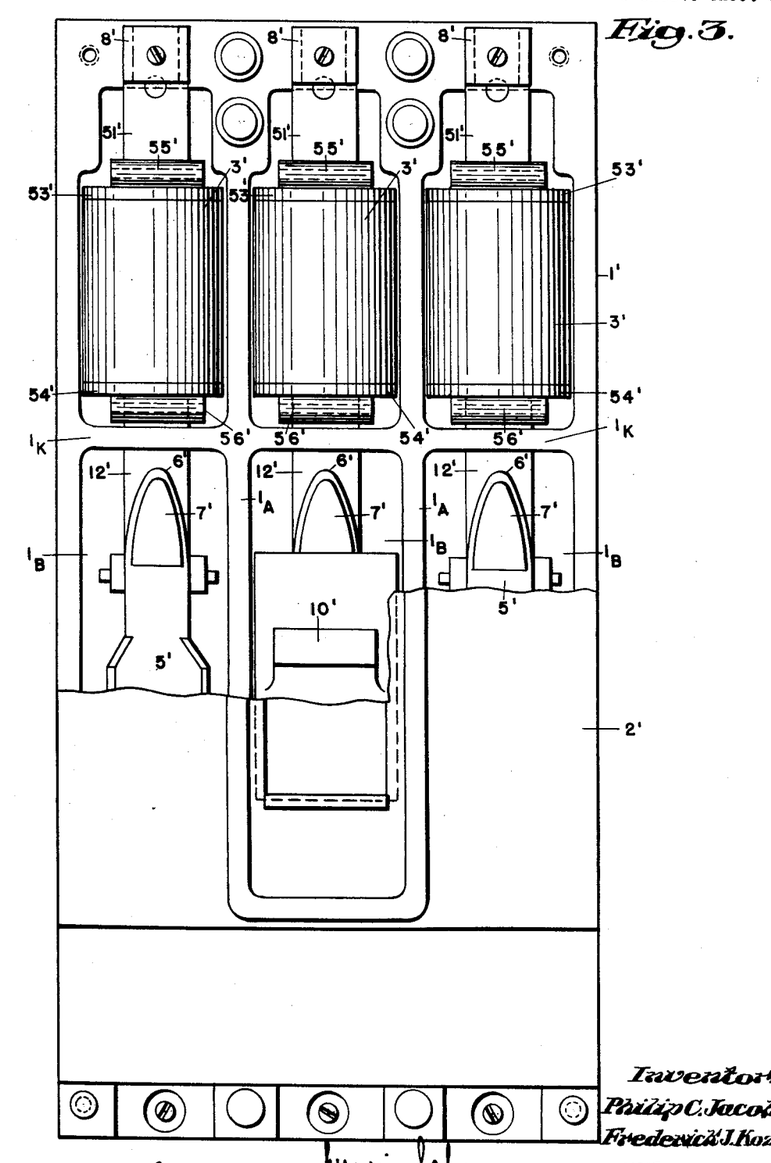
Fig. 3 is a top plan view of the structure shown in Fig. 2.

Figures 2 and 3 illustrate the structural details of a main circuit breaker, such as circuit breaker 1, shown in Fig. 1. The electromagnetic tripping devices of the circuit breaker of Figures 2 and 3 have been coordinated with the current-limiting back-up fuses so as to cause the former to trip any time one of the fuses blows, thus making it possible to dispense with striker pin devices for the fuses to trip the circuit breaker.

Referring now to Figs. 2 and 3 of the drawing, reference numeral 1' has been applied to indicate the base and reference numeral 2' has been applied to indicate the cover or hood of a molded case circuit breaker. Base 1' has a plurality of parallel partitions 1_A molded integral therewith dividing base 1' into a plurality of separate parallel channels 1_B. Base 1' forms three such channels 1_B and supports a circuit breaker structure comprising three pole structures, of pole units, each accommodated in one of the three channels 1_B. Reference numeral 17' has been applied to generally indicate the multipolar circuit breaker structure mounted on base 1. Three cable connectors 8' are arranged along the upper and lower sides of base 1'. The circuit breaker structure 17' proper comprises three fixed or stationary contacts 6' and three movable contacts 7' adapted to cooperate with the stationary contacts 6' to close and to open a polyphase circuit. Each of the three movable contacts 7' is mounted upon one of three movable switch arms 5' and forms an integral part thereof. Operating mechanism 9' includes the handle 10' and enables to move contacts 7' into engagement with, and out of engagement from, fixed contact 6'. An electroresponsive trip device generally indicated by reference numeral 11' is adapted to cause operating mechanism 9' to automatically separate contacts 7' from contacts 6' upon occurrence of overloads of inadmissible duration as well as upon occurrence of relatively large fault currents. Each fixed contact 6' is supported by a metal strip 12' secured to base 1' and projecting through an aperture in a partition 1_K extending at right angles to partitions 1_A. Each movable contact 7' is provided with a braided shunt 16' conductively connecting the respective movable contact 7' to one of the terminals 15' of trip device 11'. The opposite terminals of trip device 11' are formed by metal strips 13' upon which cable connectors 8' are mounted. Each pole of the circuit breaker includes a leaf spring 14' biasing one of the movable contacts 7' toward its cooperating fixed contact 6'.

Cross tie 18' of insulating material joins the three switch arms 5' into a unitary structure to cause simultaneous movement of all contacts 7' to the closed and the open positions thereof. The unitary structure formed by the three switch arms 5' and the cross-tie 18' is pivotally mounted on a frame structure 19' supporting all the parts of the operating mechanism 9' of the circuit breaker and forming an integral part thereof. Reference numeral 20' has been applied to indicate the pins securing the above referred to structural unit 5', 5', 5', 18' to frame structure 19'. The operating mechanism 9' comprises also a toggle made up of the two toggle links 21', 22'. The center pin 23' of toggle 21', 22' is operatively connected to handle 10' by means of the helical overcenter spring 24'. Pivot 25' of toggle 21', 22' situated immediately adjacent to base 1' connects one end of toggle 21', 22' pivotally to the central switch arm 5'. The opposite end of toggle 21', 22' is pivoted at 25" to a cradle member 26'. Pin 27' supports cradle or latch member 26' on frame 19'. Normal cradle or latch member 26' is restrained in the position shown by a cooperating latch 28' on a trip bar 29' extending transversely across and pivotally mounted on base 1. Trip bar 29', which is preferably made of insulated material, is in turn controlled by the trip device generally indicated by 11'. Occurrence of an overload current of excessive duration or of a short circuit current causes operation of trip device 11', as a result of which trip bar 29' is rocked in counterclockwise direction, as seen in Fig. 2. Hence latch 28' releases the lower end of cradle member 26', and the latter is rocked under the action of overcenter spring 24' in clockwise direction about pivot pin 27'. The movement of cradle or latch member 26' causes the pin 25" joining elements 21' and 26' to move across the center line of spring 24 which, in turn, causes toggle 21', 22' to collapse under the action of spring 24'. During the collapse of toggle 21', 22' pin 25' thereof is moved from right to left, as seen in Fig. 2, and consequently the center switch arm 5' is pulled by spring 24 from the closed position to the open position thereof. Since all three switch arms 5' are mechanically tied together by cross-tie 18', the outer switch arms 5' and their contacts 7' follow the opening movement of center switch arm 5'. Upon tripping of the circuit breaker the operating mechanism thereof may be reset by moving handle 10' in opening direction about pivot 10", which causes reengagement of cradle or latch member 26' and latch 28'.

The trip devices 11' comprise electromagnetic tripping means for instantaneous operation adapted to trip at the occurrence of relatively large fault currents and thermal tripping means adapted to trip at the occurrence of relatively small overloads of excessive duration. Each channel $1_B$ of base 1' accommodates an electromagnetic and a thermal tripping means. The current path through each pole of tripping device 11' comprises conductors 30' fixedly secured to base 1', supporting on the upper end thereof the aforementioned terminal 15' to which braided conductor 16' is attached. The lower end of conductor 30' is provided with a projection or upright 31', to which braided conductor 32' is attached. Conductor 32' establishes a current path between bimetal strip 33' and conductor 30', or upright 31', respectively. The end of bimetal strip 33' remote from base 1 is provided with a steel pin 34' intended to serve as a latch element, whereas the end of bimetal strip 33' adjacent to base 1 is supported by conductor 13' fixedly secured to base 1' by screw 52". The upper portion of conductor 30' is arranged inside of a plurality of U-shaped steel laminations 36' which are magnetized upon flow of a large fault current through conductor 30'. Movable armature 37' is biased by suitable spring means (not shown) away from base 1' and away from the pole surfaces 38' of magnetized steel laminations 36'. Armature 37' is secured to a stem 41' arranged inside of a sleeve member 40' and provided with a screw nut 39' at the end thereof opposite from armature 37'. If attracted toward pole surfaces 38', armature 37' moves nut 39' and sleeve 40' from left to right—as seen in Fig. 2—resulting in a counter-clockwise rocking motion of trip-bar 29'. Consequently, latch 28' forming an integral part of trip bar 29' is moved out of engagement with cradle or latch member 26'. Hence toggle 22', 23' is caused to collapse under the action of spring 24', and contacts 7' are caused to part from contacts 6'.

Trip device 11' further comprises in each pole thereof a frame 42' fixedly mounted on base 1' and supporting a latch member 43' pivotally mounted at 43". Latch member 43' is biased by a helical spring 44', and normally engages steel pin 34' on bimetal strip 33'. The latter is heated by $i^2 \cdot r$ losses occurring therein. Overloads of excessive duration cause downward bending of bimetal strip 33', resulting in disengagement of steel pin 34' from latch member 43'. Consequently latch member 43' is free to rotate under the action of helical spring 43' in clockwise direction—as seen in Fig. 2—about pin 43", causing a movement of sleeve 40' from left to right. Consequently trip bar 29' is rocked counter-clockwise, causing disengagement of latch 28' from cradle or latch member 26' and parting of contacts 7' from contacts 6'.

The transverse partition $1_K$ forms an integral part of base 1' and separates the three current-limiting fuses 3' from the circuit breaker structure 17'. Conductors 12' extend across or through partitions $1_K$, and are fixedly secured to base 1' by means of screws 46'. The conductors 51' of each phase support the aforementioned cable connectors 8' situated at the upper side of base 1' and are mounted on base 1' by means of screws 52'. Each current-limiting fuse 3' is provided with blade contacts 53', 54' arranged at right angles with respect to the general plane of base 1, each engaging one of a pair of fuse holders 55' and 56'. Fuse holder 56' is supported by conductor 12' and fuse holder 55' is supported by conductor 51' by means of screw 46".

If the number of fuses blown is less than three, say but one, this nevertheless results in opening of all poles of the circuit breaker since the let-through current incident to blowing of any of three fuses 3' is sufficient to energize the electromagnetic tripping means 36', 37', associated with that particular phase and consequently unlatching of latch 28'.

On occurrence of small overloads bending of bimetal strips 33' causes rocking of trip bar 29' and separation of all contacts 6, 7. In case of fault currents of larger magnitude, armature 37' is attracted by pole faces 38' and causes rocking of trip bar 29' and separation of all contacts 6', 7'. Fuses 3' do not blow unless a relatively high fault current occurs. The let-through current through any of the fuses 3' is sufficiently high and of sufficient duration to energize the magnet system 30', 36', 37' to cause rocking of trip bar 29' and separation of all contacts 6', 7'. The fuses, if blown, ought to be replaced before any attempt is made to reclose the circuit breaker. Nothing happens if the circuit breaker is reclosed upon blowing of all three fuses before proper replacement thereof. If less than all three fuses are blown and the circuit breaker is improperly reclosed before replacement of the blown fuse or fuses is effected, a current is allowed to flow which may cause tripping of the circuit breaker and thus warn the personnel that the system is still in an abnormal state.

The current-limiting fuses 3' have a relatively high current-carrying capacity, at least equal to that of the circuit breaker. In current practice coordination of current-limiting back-up fuses and circuit breakers is generally effected in such a way that all circuit interruptions fairly within the interrupting capacity of the circuit breaker, i.e. those not too close to the interrupting capacity limit thereof, where some signs of distress may appear on operation, are effected by the circuit breaker, i.e. by separation of its contacts. Only fault currents above that limit are cleared by the back-up current-limiting fuses. Circuit breakers according to this invention different from current practice in that the back-up fuses therefor blow below the interrupting capacity limit of the circuit breaker having the next smaller interrupting capacity rating step in a graded system of interrupting capacity ratings, for instance, the interrupting capacity ratings of the National Electrical Manufacturers Association (Nema). Assuming the circuit breaker 1 shown in Fig. 1 and more in detail in Figs. 2 and 3 to have a rated interrupting capacity of 25,000 amps. and assuming the circuit breakers 12 shown in Fig. 1 to have a rated interrupting capacity of but 15,000 amps., then the back-up fuses for the main circuit breaker having the interrupting capacity of 25,000 amps. are designed to blow at much smaller fault currents than 25,000 amps., i.e. such low fault currents as to effectively protect the small interrupting capacity circuit breakers 12. Since the duration of the let-through current through a current-limiting fuse is always less than one half cycle of a 60 cycle current wave, the values of $\int i^2 \cdot dt$ within the limits of that short time interval tend to be small, and therefore the peaks of the let-through currents through current-limiting fuses 3 may be allowed to exceed the interrupting capacity rating of the small interrupting capacity circuit breakers 12. Current-limiting fuses 3' nevertheless provide effective protection for the small interrupting capacity circuit breakers 12 as long as these fuses blow at currents below the thermal and the electromagnetic interrupting capacity limits of circuit breakers 12.

The aforedescribed fashion of coordinating different interrupting capacity sizes of circuit breakers and current-limiting fuses—though applicable to any kind of circuit breaker—is of particular importance in regard to molded case circuit breakers because it is imperative, in that instance, that the current-limiting fuses be accommodated within the limited standard space allotted to each circuit breaker and because, in that instance, cost-limitations compel to reduce to a minimum the number of current-limiting back-up fuses to be added to a distribution system.

The table below refers to standard interrupting capacity ratings of molded case circuit breakers.

*Ratings of molded case circuit breakers (based on nema test procedure, 60 cycles, 600 volts A.C.)*

| Frame Size amps. | Current Rating amps. | Interrupting Rating amps. |
| --- | --- | --- |
| 100 amps. (F) | 100 | 15,000 |
| 125 amps. (J) | 225 | 15,000 |
| 225 amps. (K) | 225 | 25,000 |
| 600 amps. (KL) | 400 | 25,000 |
| 600 amps. (L) | 600 | 25,000 |

Assuming that, in a distribution system, there is one feeder circuit requiring a J-type circuit breaker and that there are three feeder circuits each requiring a F-type circuit breaker, the total current normally carried by the four circuit breakers being 525 amps. An L-type circuit breaker having a current carrying capacity of 600 amps. and being combined with current-limiting fuses whose blowing characteristic intersects the tripping characteristic of the L-type circuit breaker at a point corresponding to a current of less than 15,000 amps. can be used as main circuit breaker to control the supply to the four aforementioned feeder circuits.

The table below refers to large air circuit breakers:

*Ratings of National Electrical Manufacturers Association for large air circuit breakers (60 cycles, A.C.)*

| Line | Voltage Rating, volts | Interrupting Rating 3-phase, amps. | Short-time Rating, amps. |
| --- | --- | --- | --- |
| 1 | 600 | 15,000 | 15,000 |
| 2 | 600 | 25,000 | 25,000 |
| 3 | 600 | 50,000 | 50,000 |
| 4 | 600 | 75,000 | 75,000 |
| 5 | 600 | 75,000 | 75,000 |
| 6 | 600 | 100,000 | 100,000 |
| 7 | 480 | 15,000 | 15,000 |
| 8 | 480 | 35,000 | 25,000 |
| 9 | 480 | 60,000 | 50,000 |
| 10 | 480 | 75,000 | 75,000 |
| 11 | 480 | 75,000 | 75,000 |
| 12 | 480 | 100,000 | 100,000 |
| 13 | 240 | 30,000 | 15,000 |
| 14 | 240 | 50,000 | 25,000 |
| 15 | 240 | 75,000 | 50,000 |
| 16 | 240 | 100,000 | 75,000 |
| 17 | 240 | 100,000 | 75,000 |
| 18 | 240 | 150,000 | 100,000 |

Figures 4, 5:
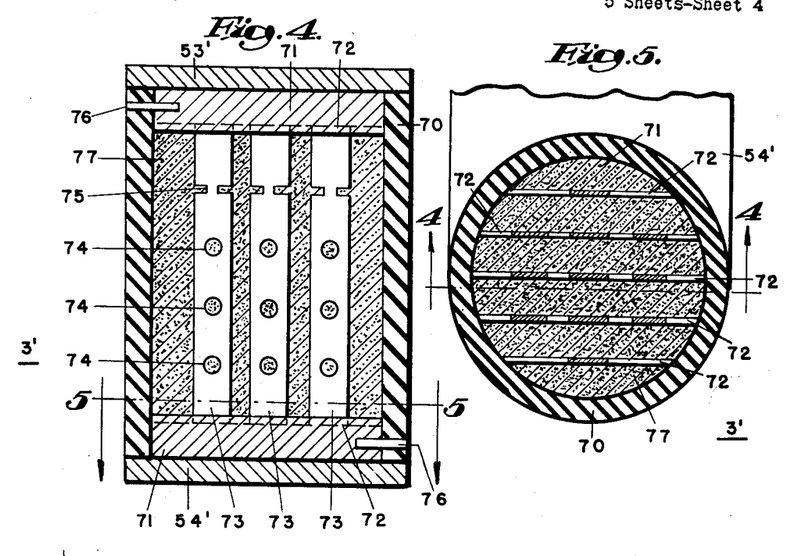
Fig. 4 is a vertical or axial section through a current-limiting fuse forming an integral part of the structure shown in Figures 2 and 3 taken along 4—4 of Fig. 5.
Fig. 5 is a section taken along 5—5 of Fig. 4.

Referring now to Figs. 4 and 5 showing fuse structure 3' on a larger scale than Figs. 2 and 3, reference numeral 70 has been applied to indicate a casing of insulating material—preferably a synthetic-resin-glass-cloth laminate—closed on both ends thereof by cylindrical copper plugs 71. The juxtaposed surfaces of plugs 71 are provided with systems of parallel grooves 72 receiving the axially outer ends of the ribbon-type fuse links 73. Links 73 are preferably made of silver and have a plurality of points of reduced cross-sectional area. Each link is provided with several circular perforations 74 defining three points of reduced cross-sectional area and with a pair of lateral incisions defining another point 75 of reduced cross-sectional area. The area at the points of reduced cross-sectional area defined by perforations 74 is considerably larger than the area of neck 75. The length of neck 75 is very small and therefore the resistance of neck 75 is very small, hence the presence of neck 75 has virtually no effect upon the current-carrying capacity of fuse links 73. On occurrence of fault currents tending to reach the interrupting capacity limit of the circuit breaker having the interrupting capacity rating next smaller to the rating of the circuit breaker with which fuses 3' are associated, arcs are kindled at necks 75, and thus the interrupting process is initiated. Fuses of the type shown in Figs. 4 and 5 have been disclosed in detail in United States Patent 2,653,203 to Frederick J. Kozacka, Current-Limiting Fuse, September 22, 1953 to which patent reference may be had regarding this type of fuses.

The ends of fuse links 73 are soldered to blocks 71 to minimize the ohmic resistance of the structure. Steel pins 76 secure casing 70 to copper blocks 71, and each of the latter supports one of the blade contacts 53', 54' for insertion of the fuse into a fuse holder (see Fig. 2). The space bounded by casing 70 and plugs 71 is filled with a suitable pulverulent arc-quenching filler 77, preferably chemically pure quartz sand.

Figure 6:
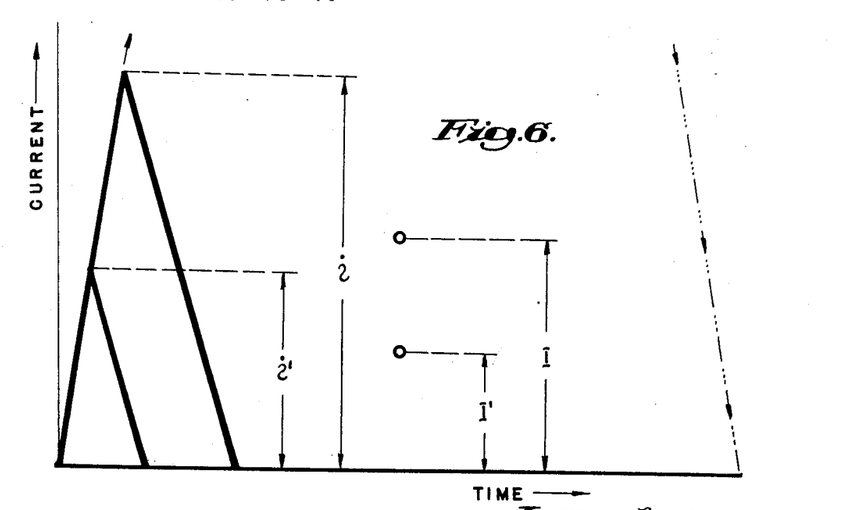
Fig. 6 is a diagram illustrating the mode of operation of the system shown in Fig. 1.
Figure 8:
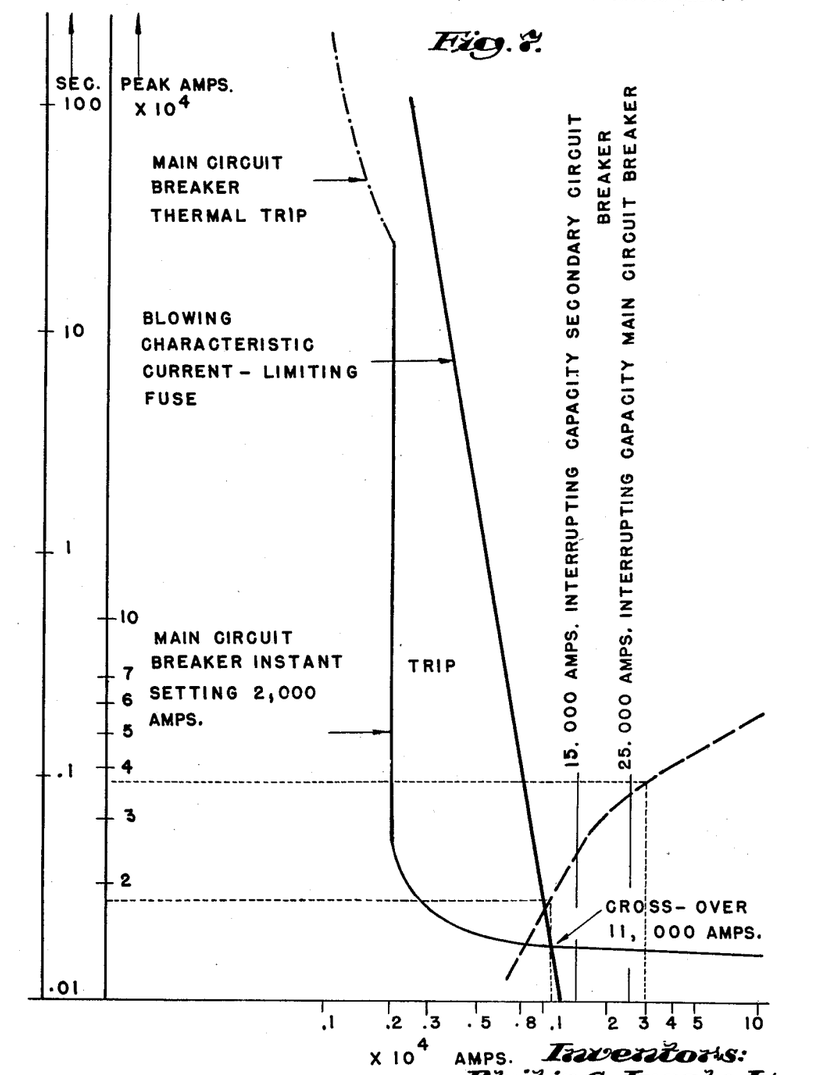

Referring now to Fig. 6, this figure shows diagrammatically one half cycle of a minor fault current plotted against time. The peak region of the current trace is not shown, only its ascending portion shortly after fault inception and decreasing portion shortly before the time of natural current zero. The peak of the permissible let-through current through a circuit breaker having a predetermined interrupting capacity rating is indicated by $i$. According to this invention the fuse 3' associated with the circuit breaker is constructed in such a way as to limit the peak of the highest let-through current which a system is able of producing to about 50% of the permissible peak, i.e. the peak as determined by the thermal and electromagnetic limitations of the circuit breaker. Reference numeral $i'$ has been applied to indicate the peak of the highest let-through current which may occur in a current-limiting fuse designed to carry the same current as a circuit breaker and to provide back-up protection for the same. There is no fixed relation between the interrupting capacity rating and the conventional short-time rating of a circuit breaker on the one hand, and the peak of the let-through current of a current-limiting back-up fuse for the circuit breaker, on the other hand. Since the conventional short-time ratings of circuit breakers depend largely on $\int i^2 \cdot dt$ over a period of many cycles, and since the duration of fault currents controlled by current-limiting fuses is in the order of ¼ of a cycle of a current wave of 60 cycles per second, the peaks of let-through currents through current-limiting back-up fuses may generally be allowed to substantially exceed the conventional short-time ratings of circuit breakers. In Fig. 6 reference letter I has been applied to indicate the short-time rating in R.M.S. amperes of the main circuit breaker (indicated by reference numeral 1 in Fig. 1) and reference letter I' has been applied to indicate the short-time rating of a secondary circuit breaker (indicated by reference numeral 12 in Fig. 1).

Referring now to Fig. 7, the diagram therein shows time in seconds and peak amperes plotted against available short-circuit currents in R.M.S. amps. symm. The trip characteristic of the main circuit breaker comprises two portions, one describing the operation of the thermal inverse current-time overload tripping means thereof and one describing the operation of the electromagnetic instantaneous tripping means when set to trip at 2000 amps. The blowing characteristic of the current-limiting back-up fuses associated with the main circuit breaker is a straight line intersecting the tripping characteristic of the main circuit breaker at a point corresponding to 11,000 amps. This extremely low cross-over in spite of a high current-carrying capacity of the back-up fuse is being achieved by the narrow necks (indicated by numeral 75 in Fig. 4) which tend to drastically reduce let-through current peaks without having a significant effect on current-carrying capacity. It is apparent from Fig. 7 that the current-limiting back-up fuses of the main circuit breaker will blow at fault currents of 11,000 amps. which could be cleared by a secondary circuit breaker since its interrupting capacity is 15,000 amps. The low cross-over point increases the life of the secondary circuit breakers since they are never called upon to operate close to their interrupting capacity limit. Continuity of service is not seriously affected by the low cross-over point since fault currents in the order of 11,000 amps. are not common in branch circuits protected by molded case 15,000 amps. interrupting capacity circuit breakers. The dash line in Fig. 7 shows let-through currents in peak amps. plotted against available amps. The ordinates of the dash line have been calculated assuming the maximum asymmetrical current R.M.S. values in each phase to be 1.4 times the symmetrical current R.M.S. values. The left portion of the dash line corresponds to interruption of relatively low currents by the back-up fuses where no current-limiting action occurs, whereas the right portion of the dash line corresponds to interruption of relatively high currents which are limited below the value of the available current. It is apparent from Fig. 7 that if a fault current between 15,000 and 11,000 amps. occurs in one of the branch circuits controlled by one of the secondary molded case circuit breakers, such fault current will be cleared by the current-limiting back-up fuses associated with the main circuit breaker, but the current will not be limited by the fuses. If the fault current is less than 11,000 amps., the secondary circuit breaker in whose circuit the fault has occurred will clear the fault current and the main circuit breaker will stay closed. This is achieved by so setting the tripping devices of the main circuit breaker and of the secondary circuit breakers as to result in selective operation at currents less than the current which corresponds to the cross-over point of the tripping characteristic of the main circuit breaker and the blowing characteristic of the back-up fuses thereof. Assuming that a fault occurs anywhere in the system tending to result in a fault current as high as 30,000 amps. R.M.S. Then the back-up fuses blow instantly and reduce the fault current to a peak value of 37,000 amps., as clearly shown in Fig. 7. The blowing characteristic of the current-limiting fuses shown in Fig. 7 has been drawn for available currents up to about 12,000 amps. R.M.S. and blowing times or pre-arcing times of .01 sec. and therefore does not includes the above case of an available current of 30,000 amps.

Where a circuit-breaker is backed-up by a current-limiting fuse, the available current at the point of the system where the fuse is located is less than normal with the circuit breaker connected into the system. This is due to the amount of impedance inherent in any circuit breaker. It has been assumed in drawing Fig. 7 and in presenting a discussion of this figure that the impedance of the circuit breakers is zero, and that its presence has not effect on the magnitude of major fault currents.

A question which arises wherever current-limiting back-up fuses are applied has to do with the short-time rating required to withstand predetermine let-through currents, i.e. let-through currents having a predetermined peak value and a predetermined $\int i^2 \cdot dt$. The conventional short-time rating standards have no bearing whatever upon the particular duty—electromagnetic and thermal—to which a circuit breaker is subjected while a backup fuse thereof is interrupting a major fault current. By plotting the permissible let-through currents through a closed circuit breaker backed up by a family of current-limiting fuses against the short-circuit currents available as limited by the impedance of the circuit breaker important information regarding coordination of fuses and circuit breakers may be obtained. In a similar way permissible peak let-through currents through serially connected current-limiting fuses and circuit breakers on closing of the latter against major faults may be plotted against the short-circuit currents available as limited by the impedance of the circuit breaker. Diagrams of this nature offer a method of arriving empirically at short-time ratings for circuit breakers in terms of peak let-through amperes where, because of the presence of current-limiting back-up fuses, the conventional short-time ratings of circuit breakers become inapplicable. We have found that a molded case circuit breaker known in the trade as a K-frame circuit breaker is capable of withstanding 60,000 to 70,000 peak amps. during the time of the flow of the let-through current through current-limiting back-up fuses for the circuit breaker arranged in series with the circuit breaker in a polyphase circuit. A molded case circuit breaker known as F-frame circuit breaker is capable of withstanding 35,000 peak amps. of the let-through current of a current-limiting fuse. If in a system as shown in Fig. 1 circut breaker 1 is a K-frame circuit breaker and circuit breakers 12 are F-frame circuit breakers, the peaks of the let-through currents through current-limiting fuses 9 must be equal to, or less than 35,000 amps. to provide back-up protection for circuit breaker 1 as well as for circuit breakers 12.

Having disclosed preferred embodiments of our invention, it is desired that the same be not limited to the particular structures disclosed. It will be obvious to any person skilled in the art that many modifications and changes may be made without departing from the broad spirit and scope of our invention. Therefore it is desired that the invention be interpreted as broadly as possible and that it be limited only as required by the prior state of the art.

We claim as our invention:

1. In combination, an automatic circuit interrupter comprising separable contacts and having a predetermined interrupting capacity rating in a system of interrupting capacity ratings of circuit interrupters having separable contacts, said interrupter including tripping means for initiating separation of said contacts, said tripping means having a predetermined time-current tripping characteristic, a current-limiting back-up fuse for said interrupter, means for connecting said interrupter and said fuse in series into an electric circuit, said fuse comprising ribbon-type fuse link means having a plurality of serially related points of reduced cross-sectional area having different sizes, one of said plurality of points having a cross-sectional area of sufficiently small size to cause the peaks of the let-through currents through said fuse to be sufficiently low to provide effective back-up protection for circuit interrupters having the next smaller interrupting capacity rating step in said system of ratings.

2. In combination a polyphase circuit, a multipolar main circuit breaker connected into said circuit, said main circuit breaker having a relatively large interrupting capacity and including a base of molded insulating material having a plurality of partitions molded integral therewith dividing said base into a plurality of separate channels, a plurality of pole units each accommodated in one of said plurality of channels and tripping means having a predetermined time-current tripping characteristic for initiating simultaneously operation of said plurality of pole units; a plurality of branches of said circuit; a plurality of secondary circuit breakers each connected into one of said plurality of branches of said circuit, each of said plurality of circuit breakers having a relatively small interrupting capacity and including tripping means adapted for selective operation with respect to said tripping means of said main circuit breaker; a plurality of current-limiting back-up fuses for said main circuit breaker; means for connecting each of said plurality of fuses in series with one of said plurality of pole units into said polyphase circuit; each of said plurality of fuses being arranged in alignment with one of said plurality of channels and supported by said base, each of said plurality of fuses comprising ribbon-type fuse link means having a plurality of points of reduced cross-sectional area of different sizes, the cross-sectional area of the point of reduced cross-sectional area of smallest size being sufficiently small to limit the peaks of the let-through currents through each of said plurality of fuses to sufficiently low values to provide effective back-up protection for each of said plurality of secondary circuit breakers.

3. In combination a polyphase electric circuit; a multipolar main circuit breaker connected into said circuit, said main circuit breaker having a relatively large interrupting capacity and including a base of molded insulating material having a plurality of parallel partitions molded integral therewith dividing said base into a plurality of separate channels, a plurality of pole units each accommodated in one of said plurality of channels, and tripping means having a predetermined time-current tripping characteristic for initiating simultaneous operation of said plurality of pole units; a plurality of branches of said circuit; a plurality of secondary circuit breakers each connected into one of said plurality of branches of said circuit, each of said plurality of secondary circuit breakers having a relatively small interrupting capacity and including tripping means adapted for selective operation with respect to said tripping means of said main circuit breaker; a plurality of current-limiting back-up fuses for said main circuit breaker; means for connecting each of said plurality of fuses in series with one of said plurality of pole units into said polyphase circuit; each of said plurality of fuses being arranged in alignment with one of said plurality of channels and supported by said base; each of said plurality of fuses comprising ribbon-type fuse links having a plurality of points of reduced cross-sectional area of different sizes, the cross-sectional area of the point of reduced cross-sectional area of smallest size being sufficiently small to establish a time-current characteristic intersecting said tripping characteristic of said main circuit breaker at a point corresponding to a smaller ampere value than the interrupting capacity rating of any of said plurality of secondary circuit breakers.

4. In combination a polyphase electric circuit; a multipolar main circuit breaker connected into said circuit, said main circuit breaker having a relatively large interrupting capacity and including a base of molded insulating material having a plurality of partitions molded integral therewith dividing said base into a plurality of separate channels, a plurality of pole units each accommodated in one of said plurality of channels, and tripping means having a predetermined time-current tripping characteristic for initiating simultaneous operation of said plurality of pole units; a plurality of branches of said circuit; a plurality of secondary circuit breakers each connected into one of said plurality of branches of said circuit, each of said plurality of circuit breakers having a relatively small interrupting capacity and including tripping means adapted for selective operation with respect to said tripping means of said main circuit breaker; a plurality of current-limiting back-up fuses for said main circuit breaker; means for connecting each of said plurality of fuses in series with one of said plurality of pole units into said polyphase circuit each of said plurality of fuses being arranged in alignment with one of said plurality of channels and supported by said base, each of said plurality of fuses comprising ribbon-type fuse link means having a plurality of points of reduced cross-sectional area of different sizes, the cross-sectional area of the point of reduced cross-sectional area of smallest size being so small as to limit the maxima let-through currents through each of said plurality of fuses to about 50% of the peak amperes which said main circuit breaker is able of withstanding during the interrupting time of a current-limiting fuse.

5. In combination a base of molded insulating material having a plurality of parallel partitions molded integral therewith dividing said base into a plurality of separate channels, a multipolar automatic circuit interrupter structure comprising a plurality of pole units each accommodated in one of said plurality of channels, a plurality of current-limiting back-up fuses for said interrupter structure each arranged in alignment with one of said plurality of channels, means for connecting said interrupter and said fuses in series into an electric circuit, each of said plurality of fuses comprising ribbon-type fuse links having a plurality of serially related points of reduced cross-sectional area of different sizes, the point of reduced cross-sectional area of smallest size being sufficiently small to limit the maxima let-through currents through each of said plurality of fuses to about 50% of the peak amperes which said interrupter structure is capable of withstanding during the interrupting time of a current-limiting fuse.

6. An electric distribution system comprising a source of current, an electric circuit supplied by said source, a first circuit breaker having a relatively high current-carrying capacity arranged in said circuit, said first circuit breaker including separable contacts and tripping means for controlling separation thereof, a second circuit breaker having a relatively small current-carrying capacity serially arranged in said circuit with said first circuit breaker, said second circuit breaker including separable contacts and tripping means adapted for controlling selective separation thereof, current-limiting fuse means serially arranged in said circuit with said first circuit breaker and said second circuit breaker at a point thereof situated nearer to said source than said second circuit breaker, said current-limiting fuse means including ribbon-type fuse link means having a plurality of serially related points of reduced cross-sectional area, all of said points except one having a relatively large cross-sectional area thereby imparting to said fuse means a current-carrying capacity of the same order as said current-carrying capacity of said first circuit breaker, and said one of said points having a sufficiently small cross-sectional area to limit let-through currents through said fuse means to values that can be withstood by both said first circuit breaker and said second circuit breaker.

7. An electric distribution system comprising a main circuit, a plurality of branch circuits derived from said main circuit, a main circuit breaker arranged in said main circuit, said main circuit breaker including separable contacts and tripping means for the control thereof, a plurality of branch circuit breakers each arranged in one of said plurality of branch circuits and each including separable contacts and tripping means adapted for controlling selective separation thereof, current-limiting fuse means serially connected with said main circuit breaker into said main circuit, said current-limiting fuse means including ribbon-type fuse link means having a plurality of serially related points of reduced cross-sectional area, one of said plurality of points having a smaller cross-sectional area than the others and the cross-sectional area of said one point being sufficiently small to limit the peaks of let-through currents through said current-limiting fuse means to values affording effective back-up protection for said plurality of branch circuit breakers whereby additional current-limiting back-up fuse means for said plurality of branch circuit breakers are dispensed with.

8. An electric distribution system comprising a main polyphase circuit, a plurality of polyphase branch circuits derived from said main circuit, a multipolar main circuit breaker arranged in said main circuit, said main circuit breaker including a base of insulating material having partitions molded integral therewith dividing said base into a plurality of separate channels, a plurality of pole units including separable contacts each accommodated in one of said plurality of channels and common tripping means for controlling said plurality of pole units, a plurality of multipolar branch circuit breakers each arranged in one of said plurality of branch circuits and each including separable contacts and selective tripping means for the control thereof, a plurality of current-limiting fuses serially connected with said main circuit breaker into said main circuit and supported by said base, each of said plurality of current-limiting fuses being arranged in alignment with one of said plurality of channels and each comprising a plurality of ribbon-type fuse links, said plurality of fuse links having a plurality of serially related points of reduced cross-sectional area, one of said plurality of points having a smaller cross-sectional area than the others, and the cross-sectional area of said one point being sufficiently small to limit the let-through currents through said plurality of current-limiting fuses to values which each of said plurality of branch circuit breakers can withstand.

References Cited in the file of this patent

UNITED STATES PATENTS

| | | |
|---|---|---|
| 1,714,722 | Moss | May 28, 1929 |
| 2,140,360 | Jennings | Dec. 13, 1938 |
| 2,473,196 | Dannenburg | June 14, 1949 |
| 2,653,203 | Kozacka | Sept. 23, 1953 |
| 2,734,111 | Kozacka | Feb. 7, 1956 |
| 2,770,757 | Edsall | Nov. 13, 1956 |